(12) United States Patent
Magnusson

(10) Patent No.: US 7,380,734 B2
(45) Date of Patent: Jun. 3, 2008

(54) SPREADER WITH TWO ROTATABLE PLATES

(75) Inventor: Jesper Magnusson, Visby (SE)

(73) Assignee: KSAB Golf Equipment AB, Vasteras (SE)

( * ) Notice: Subject to any disclaimer, the term of this patent is extended or adjusted under 35 U.S.C. 154(b) by 616 days.

(21) Appl. No.: 11/050,310

(22) Filed: Feb. 3, 2005

(65) Prior Publication Data
US 2005/0258284 A1 Nov. 24, 2005

(30) Foreign Application Priority Data
May 10, 2004 (SE) .................... 0401202

(51) Int. Cl.
*A01C 17/00* (2006.01)
*A01C 19/00* (2006.01)
*B05B 1/26* (2006.01)
*B05B 1/30* (2006.01)

(52) U.S. Cl. .............. 239/682; 239/505; 239/578; 239/685; 239/687

(58) Field of Classification Search ........... 239/473, 239/526, 665, 667, 682, 685, 686, 687, 505, 239/507, 578
See application file for complete search history.

(56) References Cited

U.S. PATENT DOCUMENTS

| 2,594,084 | A | * | 4/1952 | Skibbe et al. | 239/661 |
| 3,114,481 | A | * | 12/1963 | West | 222/138 |
| 4,597,531 | A | * | 7/1986 | Kise | 239/650 |
| 5,203,510 | A | * | 4/1993 | Courtney et al. | 239/667 |
| 6,047,909 | A | * | 4/2000 | Simpson | 239/687 |

* cited by examiner

Primary Examiner—Kevin P. Shaver
Assistant Examiner—Ryan Reis
(74) Attorney, Agent, or Firm—Rolf Fasth; Fasth Law Offices

(57) ABSTRACT

A manually driven spreader for particulate material has two rotatable plates. The dispersed material from the spreader has an even dispense pattern without unwanted skewing found in prior art spreaders. The spreader covers greater area compared with single plate spreaders. The spreader has features that allow an operator to adjust the ports of the container during operation and also blocking/unblocking the ports without having to let go of the grip of the handle used to push the spreader.

6 Claims, 3 Drawing Sheets

SPREADER WITH TWO ROTATABLE PLATES

PRIOR APPLICATION

This application is a U.S. national phase application claiming priority from Swedish Patent Application No. 0401202-7, filed 10 May 2004.

TECHNICAL FIELD

The invention at hand is directed to spreaders and methods for dispersing material, in particular the invention is directed to manually operated broadcast spreaders. Such manually operated broadcast spreaders are used for the distribution of fertilizer, seeds and pesticides or other finely divided material to the soil or vegetation.

BACKGROUND ART

There are many known rotary spreaders. Examples on spreaders are described in EP1382236, U.S. Pat. Nos. 1,769,302, 5,123,598 and 5,203,510.

U.S. Pat. No. 4,580,730 describes a rotary spreader for particulate material having a hopper for the particulate material and an impeller adapted to broadcast the material as it is discharged from the hopper. Multiple fin lengths are provided on the impeller to throw the particulate material in different radial distances aiming at providing better particulate distribution. However, the practical use of such a rotary spreader has shown that skewing of the broadcast pattern still exists. Such skewing is a problem in many situations.

U.S. patent application 20030443702 published as U.S. 2003192968 is hereby incorporated by reference and describes a spreader with a movable deflector. The spreader provides a control of pattern of dispensing material from a yard spreader. A remaining problem with the spreader is that skewing of the broadcast pattern still exists. The skewing increases with the angle of spread. A distribution of spread material distributed by a spreader similar to the spreader according to U.S. 20030443702 is shown in FIG. 1. The distribution was measured by use of cylindrically shaped cans standing on a line in the direction of movement of the spreader. The number of pieces of granulated material was counted for each can.

Spreaders according to the art may have one feature to stop the flow of material to a rotatable plate in the case the spreader stops, and second feature to control the amount of material dispersed from the hopper to the rotatable plate.

The inventors have found that for many applications the existing art is not sufficient when it comes provide spreaders with a large spread area and that at the same time avoids skewing of the broadcast pattern.

SUMMARY OF THE INVENTION

It is an object of the invention to provide an improved manually driven spreader, particularly for dispensing granular agricultural material onto terrain over which the spreader is driven, which overcomes the before mentioned problems, and others, in the operation of known spreaders. A particular object of the invention is to prevent skewing of the broadcast pattern of material. It is a further object of the invention to provide a spreader, which has a dispensing control mechanism which is efficient to use, reliable and economical. In accordance with one aspect of the present invention, the spreader comprises two rotatable plates, attached beneath a container, the rotatable plates being positioned beside each other, and further being positioned such that they are substantially parallel to the ground as the spreader is driven. The rotatable plates turns as the spreader is driven forward, one rotates clockwise and the other counter clockwise. In a further aspect of the invention, it is the number of, size and position of the holes at the bottom of the container that substantially determines the spread pattern of the material. In another aspect of the invention, the container is equipped with two sliding perforated closure elements. The perforated closure elements are used to control the level of flow of material from the container as well as turning on and off the flow of material. Each closure element is arranged in sliding means, controllable from first and second control means close to the corresponding handgrip for the hands of an operator.

An advantage with the invention is that it enables a more even spread of material as well as improved predictability of spread material. This is of significant importance at certain applications such as a golf green where uneven spread of fertilizer leads to different growth speed of the grass as well as different thickness depending of the spread of fertilizer. Another advantage of the invention is that it enables improved play of golf on the green area.

Yet, another advantage of the invention is that compared to other manually operated spreaders the invention enables the spread of material over a larger area for every turn, for instance for every turn across a golf green. This is partly due to the spreader enables less overlap of the dispensed material from a previous turn compared to prior art spreaders. This in turns saves valuable time for the operator, such as a greenkeeper.

Another advantage with the invention is that an operator controls the turning on and off dispersing material to the right or to the left directly from the control means attached close to the handgrip. Hence, compared with known spreaders less time is used to turn off the dispersing of material, for instance as the spreader is driven close to a walkway or path but on the other side disperse of material is wanted on a grass area.

A more complete understanding of the present invention and other objects, advantages and features thereof will be gained from a consideration of the following description of embodiments read in conjunction with the accompanying drawings.

BRIEF DESCRIPTION OF THE DRAWINGS

The present invention will be described in more detail in connection with the enclosed schematic drawings.

DETAILED DESCRIPTION OF THE INVENTION

Figure 3:
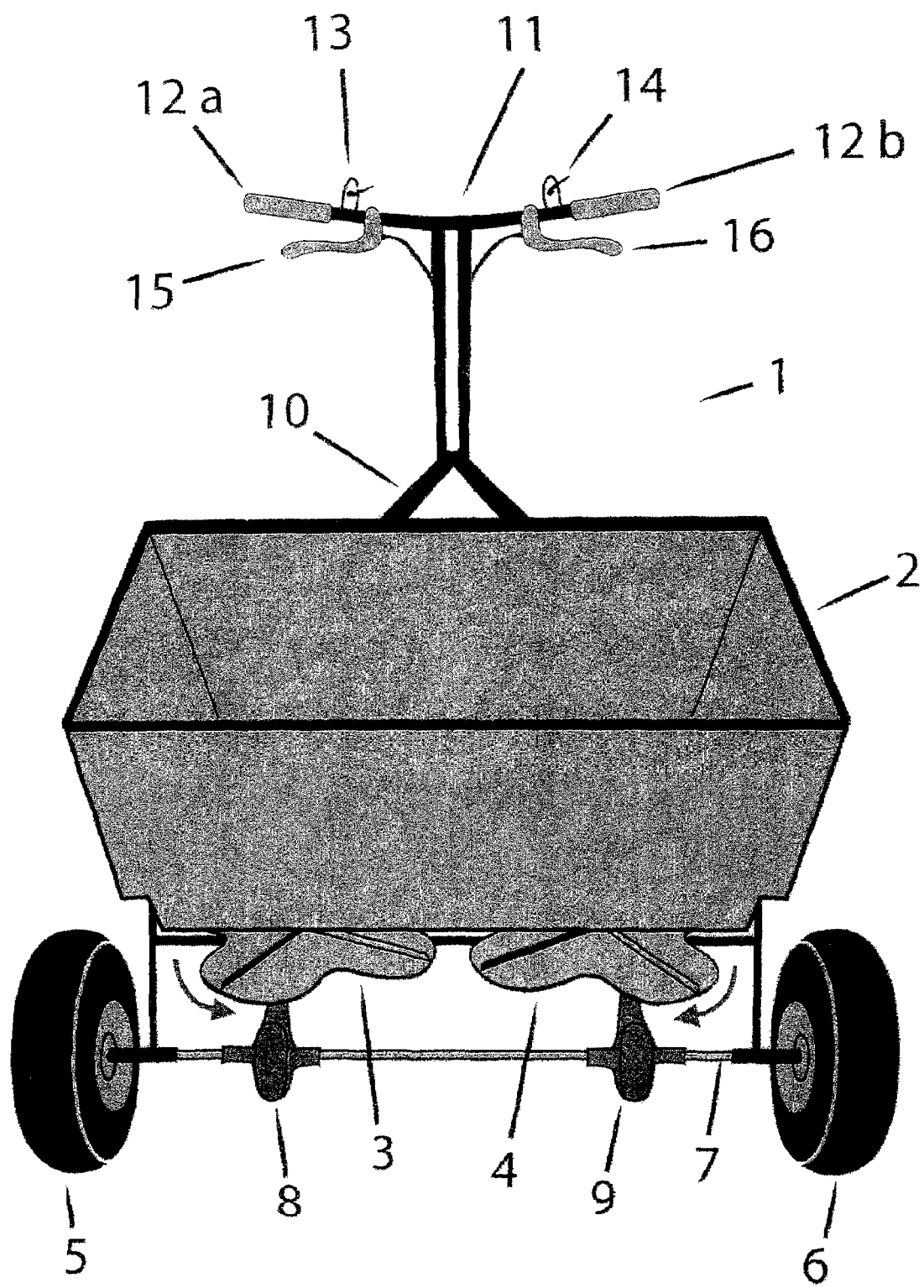
FIG. 3 shows an example of a spreader according to the invention.

A schematic drawing of the spreader 1 according to the invention is shown in FIG. 3. The spreader comprises a container 2 or a hopper. Before operation of the spreader a user or an operator places particulate or granular material such as fertilizer, pesticides, herbicides, seed and the like into a container 2 or hopper. The container 2 is mounted to an axle 7 to which a pair of wheels 5, 6 is fitted. Fitted to the axle 7 are opposing legs, such as tubular legs, which are also connected to a handle 10, for instance a tubular handle, and a rest stand. Located beneath the container are two rotable plates 3,4, rotor disks or impellers that are driven by a set of gears within a corresponding gearbox 8, 9. The upper portion of the handle 11 includes a grip 12a, 12b for each hand. The grip is for instance a foam grip.

Figure 1:
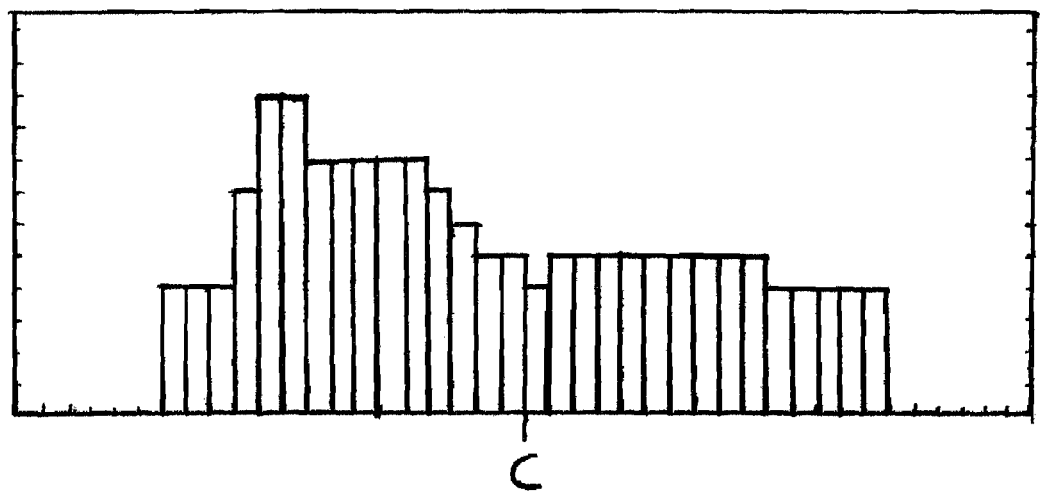
FIG. 1 shows a diagram of spread according to prior art. A number of cylindrical cans were lined up in front of the spreader's direction. Each column corresponds to the number of granulated material found in each can after the use of the spreader.
Figure 2:
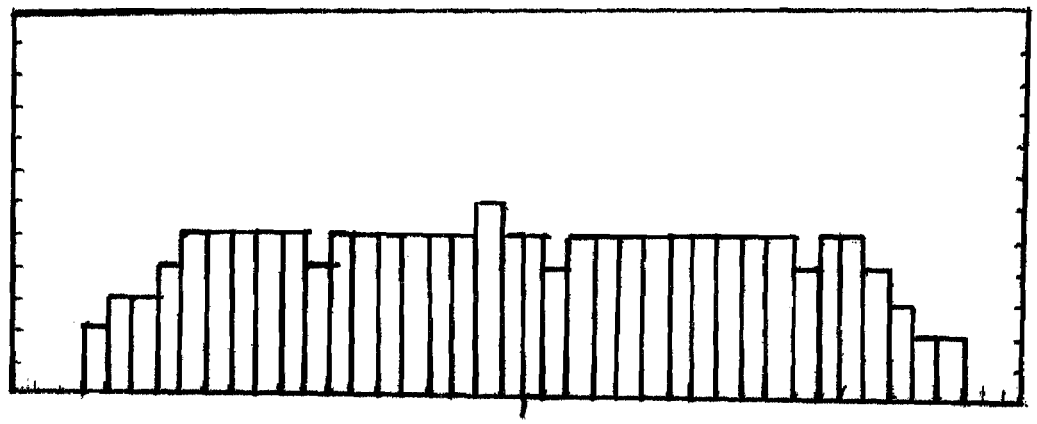
FIG. 2 displays a diagram of spread according to the invention. The same type of experiment as the one made according to prior art technology, shown in FIG. 1, was applied.

FIG. 2 is a diagram showing the dispense pattern of a spreader according to the invention. The diagram should be compared with the diagram in FIG. 1, which shows the dispense pattern of a top ranked model of spreaders according to prior art. The result of the experiments shown in FIG. 1 and FIG. 2 are repeatable. A small variation between each individual experiment is found. The character C in the figure corresponds to the centre of the spread pattern.

An advantage of the invention compared with the previous mentioned advantages is that in one embodiment a spreader according to the invention dispense material such that no deflector or protecting means is needed to limit the dispense of material. Such a deflector or protecting means leads to a higher concentration of material to certain areas of the spread pattern. This is due to that material bounces off the deflector or protecting means in a systematic manner. In an embodiment of the invention with no deflector or protecting means the spreader 1, for rotable disk, dispense material forward with a slight overlap to the dispense area of the other disk, to the side and slightly to the rear on that side.

An operator controls dispensing of particulate material from the spreader. Such an operator may be a gardener or a green keeper at a golf course. Dispensing of material is depending on if the spreader is driven or not. As the spreader is pushed forward, the dispensing of material may start as the turnable plates 3, 4 are rotating. However, in one embodiment the invention comprise a closure system for each side, which comprise control means 13, 14, 15, 16 for controlling the flow of material from the container 2. In such an embodiment, there is one set of first and second control means for each side of the spreader. It should be understood that in this description the term "left" and "right" is seen from an operators view pushing the spreader forward, which is in the direction of travel 22. The first and second control means for dispensing material off the right rotating plate are attached close to the right hand grip 12a. In the embodiment, the first and second control means for dispensing material off the left rotating plate are attached close to the left hand grip 12b. An advantage with such an embodiment compared to prior art is that an operator can adjust the amount of flow of material and controlling the on/off of flow for each side without having to bend down or releasing both grips attached to the handle. A further advantage is that the turn off of flow for one side, hence the turn off the dispense of material for that side, is enabled during operation of the spreader 1. That means that compared to prior art an operator may continue to push the spreader 1 and at the same time turn off the flow for one side, for instance as the spreader get closer to a path or a walkway, and continue to spread material to the other side such as a lawn.

Each closure system comprises a perforated closure element. An example of such a closure element is a metal plate of 3-6 mm thickness made out of stainless steel attached into two sliding means beneath the container above each of the rotatable plates 3, 4. The container 2 has two ports 20, 21 from which the material may flow and the closing means are attached to the ports. The first control means 13, 14 at the grip is used to control to which degree a closing means is open in its unblocked position. The second control means 15, 16 is used to block or unblock the corresponding port 20, 21. The first control means 13, 14 may be an adjustment micrometer. Such a control means may be marked with a scale indicating different diameter of material or type of material for easier adjustment. The second control means 15, 16 may, as the example in FIG. 3, look like a brake handle for a bike. In an embodiment the second control means is intended to be pulled by the hand of the operator towards the handgrip and held in such a position in order to turn on the flow of material. The second control means may have in another embodiment a toggling function such that an operator pulls or operates the second control means 15, 16 for both blocking and unblocking the port with the closing means. The decision of an operator via the first and second control means is transmitted to the closing means by a wire.

Figures 4, 5:
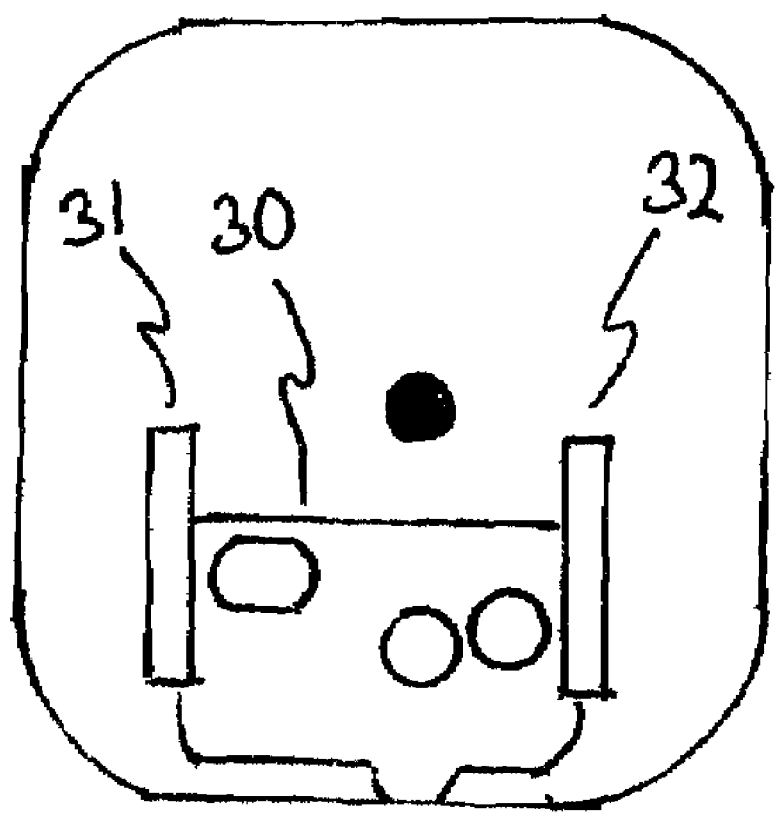
FIG. 4 shows a schematic figure of the container seen from above and the two ports. Each port comprises three holes at the bottom of the container.
FIG. 5 is simplified drawing of a closing means attached beneath the container.

FIG. 4 shows an embodiment of the right side port 21 with three holes 25a, 26a, 27a, seen from above and standing behind the spreader 1 looking in the direction of the spreader's travel 22. Further, FIG. 4 shows an embodiment of the right side port 20 with three holes seen from above and standing behind the spreader 1. The layout of the holes between the left and right side are made in the same manner. However, the layout of the right hand side is mirrored compared with the left side. It is preferred that two holes are substantially round and one hole is substantially oval. As shown in FIG. 4 the holes are preferred to be positioned behind the centre (28, 29) of the rotating plates (3, 4). The holes in FIG. 4 are seen from a view standing behind the spreader (1) in the direction of travel (22) looking down into the container (2). Calculations and experiments have shown that such a set-up of holes results in an even spread of material.

According to a preferred embodiment where the right port's (21) holes are positioned such that the first round hole (25a) being positioned to the right of a centre line (24) of the rotatable plate (4, 28). The second round hole (26a) is in the preferred embodiment positioned substantially on the centerline (24), the oval hole (27a) being positioned to the left of the centerline (26) and the oval hole (27a) being positioned closest to the rotating plate's center (28). The diameter of the round holes should be at the sizes well known to a person skilled in the art.

A particular challenge for the inventor has been to avoid a high concentration of dispensed material directly in front of the spreader. There is a need for a slight overlap between the spread from the left and the right rotatable disk but the overlap must be precise. Otherwise the spread pattern will show unwanted higher concentration of material directly in front of the spreader. A layout of holes according to FIG. 4 avoids such unwanted high concentration of material.

Further, such a layout, shown in FIG. 4, has the advantage of not having spread material being dispensed in a direction behind the spreader. This means that in one embodiment there is no need for any other means preventing material to hit the operator. Prior art spreaders commonly have a plate or deflector attached in order to avoid material to hit the operator.

It should be understood that this description is exemplifications of the invention and it should not limit the scope of the invention or its underlying idea.

Changing the type of container, the closing means, the ports or type of grip will result in equivalent structures. Other alternatives will also be equivalent, as will many new technologies.

While the present invention has been described in accordance with preferred compositions and embodiments, it is to be understood that certain substitutions and alterations may be made thereto without departing from the spirit and scope of the following claims.

The invention claimed is:

1. A manually driven broadcast spreader for dispensing of particulate materials, the spreader comprising:
   two grips attached to a handle enabling the spreader to be pushed;
   a container for holding particulate material with ports at the bottom of the container;
   two rotatable plates attached beneath the container and substantially parallel to the ground as the spreader is driven, one plate rotating clockwise and the other plate rotating counter clockwise, wherein the distribution pattern of particulate material is substantially identical on the left and the right side of the spreader;
   each port comprising two substantially round holes and one substantially oval hole, and wherein all holes being positioned behind the center of the rotating plates, seen from a view standing behind the spreader in the direction of travel looking down into the container; and
   wherein the right port's holes being positioned such that the first round hole being positioned to the right of a center line of the rotatable plate in the direction of the spreader's travel, the second round hole being positioned substantially on the center line, the oval hole being positioned to the left of the center line and the oval hole being positioned closest to the center of the rotating plate.

2. A spreader according to claim 1 wherein two port closure systems each controls a port and the right side closure system is controlled at the right grip and the left side closure system is controlled at the left hand grip.

3. A spreader according to claim 2 wherein each closure system comprises a first control means for adjusting the flow of the particulate material from the container to the corresponding rotatable plate and a second control mechanism for turning the flow on and off.

4. A spreader according to claim 1 wherein the two rotatable plates are disposed between the container and an axle to which wheels are attached.

5. A spreader according to claim 4 wherein the handle has control means for controlling a flow of material from the container.

6. A spreader according to claim 1 wherein the left port's holes are positioned such that the first round hole being positioned to the left of the center line of the rotatable plate in the direction of the spreader's travel, the second round hole being positioned substantially on the center line, the oval hole being positioned to the right of the center line and the oval hole being positioned closest to the center of the rotating plate.

* * * * *